(12) United States Patent
Yoneda et al.

(10) Patent No.: US 7,966,086 B2
(45) Date of Patent: Jun. 21, 2011

(54) PLAYBACK APPARATUS, PLAYBACK METHOD, AND COMPUTER PROGRAM

(75) Inventors: Michiaki Yoneda, Kanagawa (JP);
Shigetaka Kudo, Kanagawa (JP);
Takashi Koya, Kanagawa (JP);
Taketeru Fujimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1014 days.

(21) Appl. No.: 11/827,002

(22) Filed: Jul. 10, 2007

(65) Prior Publication Data

US 2008/0015718 A1    Jan. 17, 2008

(30) Foreign Application Priority Data

Jul. 14, 2006   (JP) .................. 2006-194937

(51) Int. Cl.
*G06F 17/00* (2006.01)
(52) U.S. Cl. ........................................................ 700/94
(58) Field of Classification Search .................. 700/94; 370/230; 375/371; 725/58, 87, 93, 98
See application file for complete search history.

(56) References Cited

U.S. PATENT DOCUMENTS

| 6,985,069 | B2 | 1/2006 | Marmaropoulos |
| 2002/0188747 | A1 | 12/2002 | Takeuchi et al. |

FOREIGN PATENT DOCUMENTS

| EP | 1343295 A2 | 9/2003 |
| JP | 10-063458 | 3/1998 |
| JP | 10-285594 | 10/1998 |
| JP | 10-322691 | 12/1998 |
| JP | 11-306737 | 11/1999 |
| JP | 2002-164886 | 6/2002 |
| JP | 2002-217990 | 8/2002 |
| JP | 2002-368634 | 12/2002 |
| JP | 2003-058192 | 2/2003 |
| JP | 2003-255959 A | 9/2003 |
| JP | 2003-331524 | 11/2003 |
| JP | 2004-093729 | 3/2004 |
| JP | 2004-515949 | 5/2004 |
| JP | 2004-318961 A | 11/2004 |
| JP | 2004-333674 | 11/2004 |
| JP | 2005-122034 | 5/2005 |
| JP | 2006-030577 A | 2/2006 |
| JP | 2006-031394 | 2/2006 |

*Primary Examiner* — Andrew C Flanders
(74) *Attorney, Agent, or Firm* — Wolf, Greenfield & Sacks, P.C.

(57) ABSTRACT

A playback apparatus can communicate with a second server, which temporarily stores in a first buffer compressed digital data that is received from a first server, and when the first buffer has stored a first data volume of the compressed digital data, which is a volume that is sufficient for a decoding of the compressed digital data, reads the compressed digital data out of the first buffer and decodes it into decompressed digital data. The playback apparatus includes a second buffer, which temporarily stores the decompressed digital data that is received from the second server; a D/A conversion portion (340), which converts into analog data the decompressed digital data that is temporarily stored in the second buffer; and a notification information generation portion (370), which generates notification information that conveys storage statuses of the first buffer and the second buffer.

5 Claims, 9 Drawing Sheets

PLAYBACK APPARATUS, PLAYBACK METHOD, AND COMPUTER PROGRAM

CROSS REFERENCES TO RELATED APPLICATIONS

The present invention contains subject matter related to Japanese Patent Application JP 2006-194937 filed in the Japan Patent Office on Jul. 14, 2006, the entire contents of which being incorporated herein by reference.

BACKGROUND OF THE INVENTION

1. Field of the Invention

The present invention relates to a playback apparatus, a playback method, and a computer program.

2. Description of the Related Art

Recently, services are being operated that distribute content data such as Internet radio, music, images, and the like from content distribution servers in which the content data are stored to playback apparatuses such as audio devices, image devices, and the like that are held by users and that are equipped with communications functions that utilize the TCP/IP protocol. For example, a user can use a playback apparatus to obtain a list of the content data that a content distribution server can distribute, select the content data he desires from the list, and receive the selected content data.

The playback apparatus has a buffer to store temporarily the content data that is received from the content distribution server. Once a specified volume of content data is stored in the buffer, playback of the content data can start. If, during the buffering process, the storage status of the content data in the buffer, that is, the status of the buffering process, is displayed, the user can ascertain the time remaining until the playback starts.

On the other hand, where the playback apparatus is not directly connected to the Internet due to a problem in a setting for a domain name server (DNS), a default gateway, or the like, or where the playback apparatus is not equipped with a module that is compatible with the format of the content data that is distributed from the content distribution server, the content data cannot be seen or heard on the playback apparatus. To handle such cases, a system has been proposed in which a home server (for example, a personal computer (PC)) is provided between the content distribution server and the playback apparatus, and the home server receives the content data from the content distribution server, converts the content data into a format that the playback apparatus can handle, and transmits the content data to the playback apparatus (see, for example, Japanese Patent Application Publication No. JP-A-2003-255959).

Also, in the system described above, a technology has been proposed that displays on the playback apparatus the status of the buffering process for the content data in the home server. In this case, the user can use the home server buffering process status that is displayed on the playback apparatus as an approximate indication to determine the time remaining until the playback starts.

SUMMARY OF THE INVENTION

However, for the playback of the content data to start, it is necessary for a specified volume of the content data actually to be stored in the buffer of the playback apparatus. Therefore, if only the home server buffering process status is displayed on the playback apparatus, the user cannot accurately ascertain the time remaining until the playback of the content data starts.

Accordingly, the present invention addresses the above-identified problems and provides a new and improved playback apparatus, a playback method, and a computer program that can notify the user of the storage statuses of both a first buffer and a second buffer.

According to an embodiment of the present invention, there is provided a playback apparatus that can communicate with a second server, which temporarily stores in a first buffer compressed digital data that is received from a first server, and when the first buffer has stored a first data volume of the compressed digital data, which is a volume that is sufficient for a decoding of the compressed digital data, reads the compressed digital data out of the first buffer and decodes it into decompressed digital data. The playback apparatus includes a communication portion, which transmits data to and receives data from the second server; a second buffer, which temporarily stores the decompressed digital data that is received from the second server through the communication portion; a D/A conversion portion, which performs a D/A conversion of the decompressed digital data, which is read out from the second buffer, and outputs analog data; a control portion, which performs control such that, when a second data volume of the decompressed digital data, which is a volume that is sufficient for the D/A conversion portion to operate without an interruption of its output, has been temporarily stored in the second buffer, the decompressed digital data that is temporarily stored in the second buffer is transferred to the D/A conversion portion; and a notification information generation portion, which generates notification information that conveys storage statuses of the first buffer and the second buffer.

In this configuration, the notification information generation portion generates the notification information, which conveys the storage statuses of the first buffer of the second server and the second buffer of the playback apparatus, based on the data volume of the compressed digital data that is temporarily stored in the first buffer and the data volume of the decompressed digital data that is temporarily stored in the second buffer. Therefore, based on the notification information, the user can accurately ascertain the overall buffer storage status, which combines the storage status of the first buffer and the storage status of the second buffer.

The control portion may receive from the second server through the communication portion an end notification, which indicates that the first data volume of the compressed digital data has been stored in the first buffer, and may transmit through the communication portion request information that requests the decompressed digital data. When the decompressed digital data that is transmitted from the second server in response to the request information is received through the communication portion, the decompressed digital data may be temporarily stored in the second buffer.

The notification information generation portion may generate the notification information based on the data volume of the compressed digital data that is temporarily stored in the first buffer and the data volume of the decompressed digital data that is stored in the second buffer. If this configuration is adopted, the notification information generation portion can generate the notification information, which shows the data volumes that are temporarily stored in the first buffer and the second buffer, at any point in time, regardless of the data communication speed.

The notification information may also be sound information that uses a sound to convey the storage statuses of the first buffer and the second buffer. If this configuration is adopted, the notification information can be expressed as a sound that has a frequency, an amplitude, a soundless period, and the like according to the storage statuses of the first buffer and the second buffer. Therefore, the user can ascertain the storage statuses of the first buffer and the second buffer just by listening to the sound, without looking at the playback apparatus.

The notification information may also be image information that uses an image to convey the storage statuses of the first buffer and the second buffer. If this configuration is adopted, the user can ascertain the storage statuses of the first buffer and the second buffer through the sense of sight.

The notification information may also be numerical value information that indicates the data volumes that are temporarily stored in the first buffer and the second buffer as ratios of the first data volume and the second data volume, respectively. If this configuration is adopted, the user can precisely ascertain the storage statuses of the first buffer and the second buffer, because the storage statuses of the first buffer and the second buffer are contained in the notification information in a more detailed form.

The notification information may also be numerical value information in the form of a first ratio that indicates the data volume of the compressed digital data that is stored in the first buffer and a second ratio that indicates the data volume of the decompressed digital data that is stored in the second buffer, a weighting of the ratios being varied according to a file format of the compressed digital data. If this configuration is adopted, even if there is a difference between the time required for the first data volume of the compressed digital data to be temporarily stored in the first buffer and the time required for the second data volume of the compressed digital data to be temporarily stored in the second buffer, the rate of change in the numerical value information per unit time can be maintained at a nearly fixed rate.

The notification information generation portion may change the content of the notification information that it generates when the end notification is received from the second server. If this configuration is adopted, the notification information generation portion generates at least two types of the notification information, and the user can determine whether or not the end notification has been transmitted from the second server based on which type of the notification information is generated.

The notification information generation portion may also change, in incremental steps, the content of the notification information that it generates, based on the data volume of the compressed digital data that is temporarily stored in the first buffer and the data volume of the decompressed digital data that is temporarily stored in the second buffer.

The notification information generation portion may also maintain the content of the notification information that it generates when the data volume of the decompressed digital data that is temporarily stored in the second buffer reaches the second data volume. In this configuration, the notification information generation portion uses the fact that the second buffer has temporarily stored the second data volume of the decompressed digital data as a trigger to maintain the content of the notification information that the notification information generation portion generates. Therefore, when the content of the notification information is maintained, the user can determine that the second buffer has temporarily stored the second data volume of the decompressed digital data.

The notification information generation portion may also stop generating the notification information when the data volume of the decompressed digital data that is temporarily stored in the second buffer reaches the second data volume. If this configuration is adopted, the notification information generation portion uses the fact that the second buffer has temporarily stored the second data volume of the decompressed digital data as a trigger to stop generating the notification information that the notification information generation portion generates. Therefore, when the generation of the notification information stops, the user can determine that the second buffer has temporarily stored the second data volume of the decompressed digital data.

The notification information generation portion may also start generating the notification information when the first buffer starts receiving the compressed digital data from the first server.

The control portion may also obtain the storage status of the first buffer through the communication portion. If this configuration is adopted, the control portion can obtain the storage status of the first buffer by having the second server transmit the storage status of the first buffer at the request of the control portion or on a regular schedule and can output the obtained storage status of the first buffer to the notification information generation portion.

According to another embodiment of the present invention, there is provided a playback method for a playback apparatus that can communicate with a second server, which temporarily stores in a first buffer compressed digital data that is received from a first server, and when the first buffer has stored a first data volume of the compressed digital data, which is a volume that is sufficient for a decoding of the compressed digital data, reads the compressed digital data out of the first buffer and decodes it into decompressed digital data. The playback method includes a step of receiving the decompressed digital data from the second server; a step of temporarily storing the received decompressed digital data in a second buffer; a step of transferring the decompressed digital data that is temporarily stored in the second buffer to a D/A conversion portion when a second data volume of the decompressed digital data, which is a volume that is sufficient for the D/A conversion portion to operate without an interruption of its output, has been temporarily stored in the second buffer; a step of executing, in the D/A conversion portion, a D/A conversion of the decompressed digital data that is transferred from the second buffer and outputting analog data; and a step of generating notification information that conveys storage statuses of the first buffer and the second buffer for at least a time period from when the compressed digital data is temporarily stored in the first buffer until the second data volume of the decompressed digital data is temporarily stored in the second buffer.

In this configuration, the notification information, which conveys the storage statuses of the first buffer of the second server and the second buffer of the playback apparatus, is generated based on the data volume of the compressed digital data that is temporarily stored in the first buffer and the data volume of the decompressed digital data that is temporarily stored in the second buffer. Therefore, based on the notification information, the user can accurately ascertain the overall buffer storage status, which combines the storage status of the first buffer and the storage status of the second buffer.

According to another embodiment of the present invention, there is provided a computer program that includes instructions that command a computer to function as a playback apparatus that can communicate with a second server, which temporarily stores in a first buffer compressed digital data that is received from a first server, and when the first buffer has stored a first data volume of the compressed digital data, which is a volume that is sufficient for a decoding of the compressed digital data, reads the compressed digital data out of the first buffer and decodes it into decompressed digital data. The playback apparatus includes a communication portion, which transmits data to and receives data from the second server; a second buffer, which temporarily stores the decompressed digital data that is received from the second server through the communication portion; a D/A conversion portion, which performs a D/A conversion of the decompressed digital data, which is read out from the second buffer, and outputs analog data; a control portion, which performs control such that, when a second data volume of the decompressed digital data, which is a volume that is sufficient for the D/A conversion portion to operate without an interruption of its output, has been temporarily stored in the second buffer, the decompressed digital data that is temporarily stored in the second buffer is transferred to the D/A conversion portion; and a notification information generation portion, which generates notification information that conveys storage statuses of the first buffer and the second buffer.

In this configuration, the notification information generation portion, which includes the computer that functions as the playback apparatus, generates the notification information, which conveys the storage statuses of the first buffer of the second server and the second buffer of the playback apparatus, based on the data volume of the compressed digital data that is temporarily stored in the first buffer and the data volume of the decompressed digital data that is temporarily stored in the second buffer. Therefore, based on the notification information, the user can accurately ascertain the overall buffer storage status, which combines the storage status of the first buffer and the storage status of the second buffer.

According to the embodiments of the present invention described above, it is possible to notify the user of the combined storage statuses of both the first buffer and the second buffer.

DETAILED DESCRIPTION OF THE PREFERRED EMBODIMENTS

Hereinafter, a preferred embodiment of the present invention will be described in detail with reference to the appended drawings. Note that, in this specification and the appended drawings, structural elements that have substantially the same function and structure are denoted with the same reference numerals, and repeated explanation of these structural elements is omitted.

An overview of a content transfer system in which a playback apparatus according to an embodiment of the present invention is used will be explained.

Figure 1:
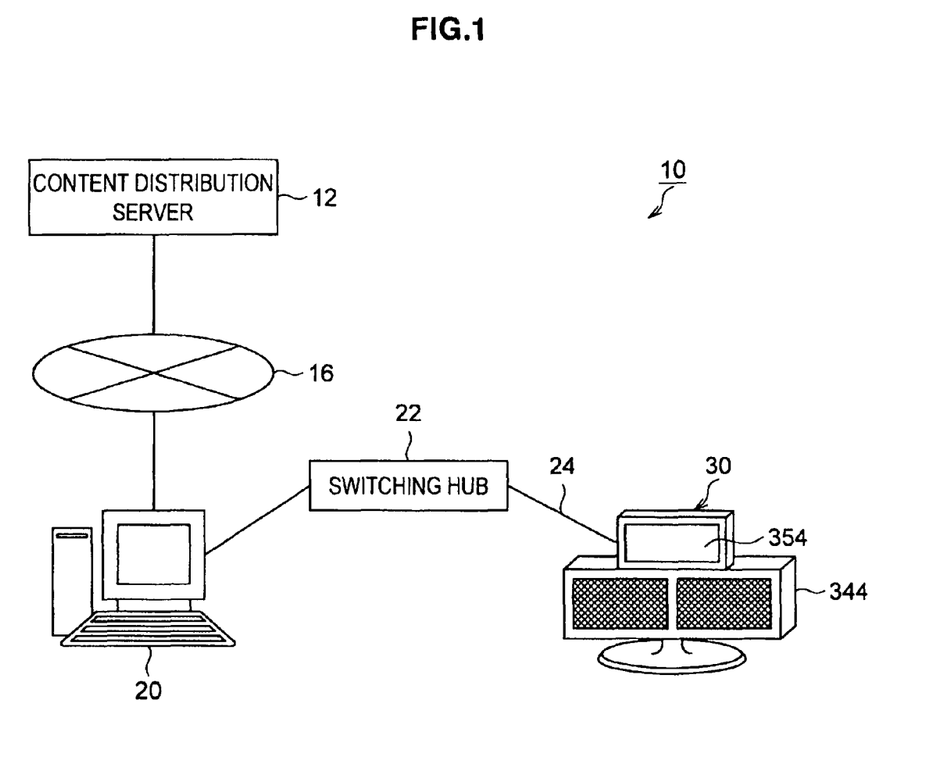
FIG. 1 is an explanatory figure that shows the configuration of a content transfer system according to an embodiment of the present invention.

FIG. 1 is an explanatory figure that shows the overall configuration of the content transfer system according to the present embodiment. The content transfer system 10 includes a content distribution server 12, a communication network 16, a home server 20, a switching hub 22, a home network 24, and a playback apparatus 30.

The content distribution server 12 functions as a first server that distributes to the home server 20, through the communication network 16, content data for which a distribution request has been received from the home server 20. The concept of the content data is that it includes music data such as music, performances, Internet radio, and the like, image data such as movies, television programs, video programs, photographs, paintings, diagrams, and the like, and any other type of data, such as games, software, and the like.

Also, the content distribution server 12 can distribute the content data to the home server 20 as compressed digital data (hereinafter called simply "compressed data"), into which form the content data has been compressed. For example, where the content data is music data, the system for compressing the data may be Adaptive Transform Acoustic Coding (ATRAC), MPEG Audio Layer 3 (MP3), Advanced Audio Coding (AAC), Windows Media Audio (WMA), or the like.

Note that the content distribution server 12 can distribute the content data to the home server 20 using a wide variety of file systems (or file formats), such as a streaming system, a download system, or the like. Here, the streaming system is any system that distributes the content data in a manner that is synchronized to the playback speed or the transfer speed of the content data on the home server 20. That is, viewed from the home server 20, the system plays back or transfers the content data as it is received. By contrast, the download system is a system in which playback or transfer of the content data on the home server 20 starts after all of the content data is distributed to the home server 20.

The home server 20 functions as a second server that relays the content data between the content distribution server 12 and the playback apparatus 30. To explain the process in greater detail, the home server 20 transmits to the playback apparatus 30 a content list that shows the content data that the content distribution server 12 can distribute. The home server 20 also sends a request to the content distribution server 12 for the content data that the playback apparatus 30 has selected from the content list, then receives the content data as compressed data. The home server 20 also decodes the compressed data and transmits the decoded, decompressed data to the playback apparatus 30.

Note that the system by which the content distribution server 12 transmits the compressed data to the home server 20 will be explained below on the assumption that it is a streaming system, but the transmission system is not limited by this assumption, and a download format may also be used. Also, the format of the compressed data may be linear pulse code modulation (linear PCM) with a sampling frequency of 44.1 kHz and 16-bit quantization.

The content distribution server 12 and the home server 20 can each be configured as an information processing device, such as a personal computer (PC), a household image processing device (DVD recorder, video deck, or the like), a mobile telephone, a Personal Handyphone System (PHS), a mobile music playback apparatus, a mobile image processing apparatus, a personal digital assistant (PDA), a household game console, a mobile game machine, a household electric appliance, an audio-visual (AV) component, or the like. Note that where the home server 20 is configured as a PC, it may be configured without a display and without an operation portion (for example, a keyboard) for the user to operate the home server 20 directly.

The playback apparatus 30 receives a content data playback request from the user and performs the playback of the content data, for example. The playback apparatus 30 includes a display portion 354, and the display portion 354 displays the content list that was obtained from the home server 20 through the switching hub 22 and the home network 24. When the user selects the desired content from the content list, the playback apparatus 30 requests the distribution of the content data from the content distribution server 12 through the home server 20. Note that the home network 24 can be configured as an in-home local area network (LAN), either wired or wireless, and one or two or more playback apparatuses can be connected to the home server 20.

Thereafter, the playback apparatus 30, while receiving the decompressed data from the content distribution server 12 through the home server 20, can play back the decompressed data on an audio output portion 344. The playback apparatus 30 as described above may be a music playback apparatus, an image playback apparatus, or a game console, so long as it is capable of playing back the decompressed data. Also, the playback apparatus 30 may be a Digital Media Player (DMP), that is, a client device of the home server 20, and the home server 20 may be a Digital Media Server (DMS), both the DMP and the DMS being defined by the guidelines of the Digital Living Network Alliance (DLNA).

Note that the home server 20 and the playback apparatus 30 may be connected by 10base2 or 1000baseT cabling or the like to form an Ethernet, or they may form a wireless local area network (LAN) as prescribed by the 802.11 group of the Institute of Electrical and Electronics Engineers, Inc. (IEEE). The home server 20 and the playback apparatus 30 may also be configured to mutually transmit and receive data using the Transmission Control Protocol/Internet Protocol (TCP/IP) as a communications protocol. The playback apparatus 30, in the same manner as the home server 20, can also be configured as an information processing device, such as a PC, a household image processing device, a mobile telephone, a PHS, a mobile music playback apparatus, a mobile image processing apparatus, a PDA, a household game console, a mobile game machine, a household electric appliance, an audio-visual (AV) component, or the like.

Thus the playback apparatus 30 according to the present embodiment does not need to be equipped with a module to decode the content data, for example, a decoder or a module connected to the Internet, so the playback apparatus 30 can be manufactured for a modest cost. Also, because the decoding of the content data is done on the home server 20, the content data can be decoded highly accurately.

Next, the configurations of the home server 20 and the playback apparatus 30 will be explained in detail.

Figure 2:
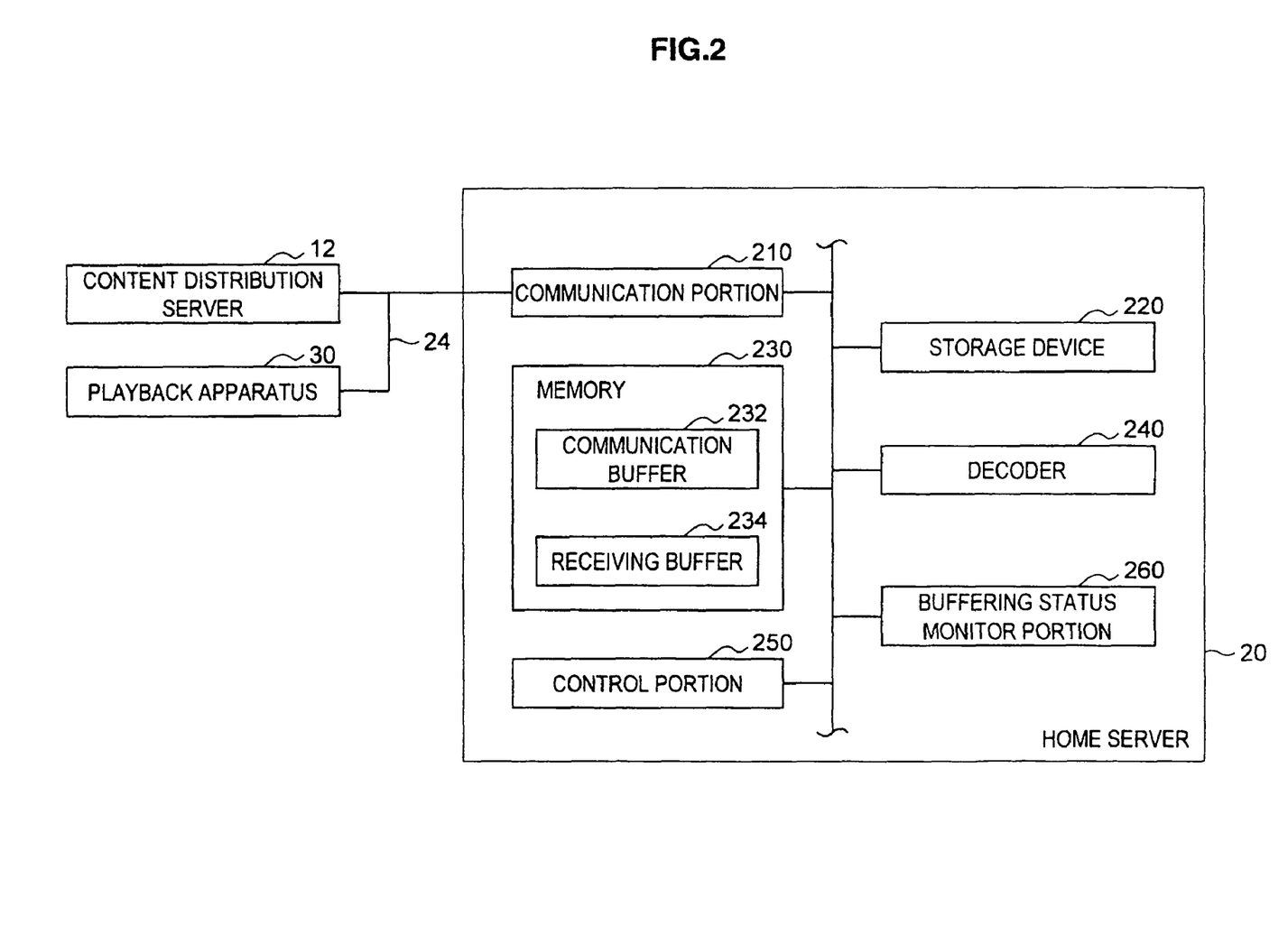
FIG. 2 is a block diagram that shows the configuration of a home server according to the embodiment.

FIG. 2 is a block diagram that shows the configuration of the home server 20 according to the present embodiment.

The home server 20 includes a communication portion 210, a storage device 220, a memory 230, which includes a communication buffer 232 and a receiving buffer 234, a decoder 240, a control portion 250, and a buffering status monitoring portion 260.

Through the communication network 16, the communication portion 210 transmits to and receives from the content distribution server 12 various types of information, such as the compressed data, the content distribution requests, and the like. The communication portion 210 also transmits to and receives from the playback apparatus 30 various types of information, such as the decompressed data, the content list, and the like. When the communication portion 210 transmits and receives the various types of information, the communication portion 210 can use the communication buffer 232.

The storage device 220 functions as a storage medium that stores the compressed data that is received from the content distribution server 12, for example. When the home server 20 performs streaming playback or streaming transfer of the content data, it does not need to use the storage device 220, but when the home server 20 utilizes the download system, all of the content data is stored in the storage device 220.

Note that the storage medium of the storage device 220 may be a storage medium such as, for example, a non-volatile memory such as an electrically erasable programmable read-only memory (EEPROM), an erasable programmable read-only memory (EPROM), or the like, a magnetic disk such as a hard disk, a flexible disk, or the like, an optical disk such as a compact disc recordable (CD-R), a compact disc rewritable (CD-RW), a digital versatile disc recordable (DVD–R), a digital versatile disc rewritable (DVD–RW), a dual-layer digital versatile disc recordable (DVD+R), a dual-layer digital versatile disc rewritable (DVD+RW), a digital versatile disc random access memory (DVD-RAM), a Blu-ray™ disc recordable (BD-R), a dual-layer Blu-ray™ disc recordable (BD-RE), or the like, or a magneto-optical (MO) disk.

The memory 230 includes the communication buffer 232 and the receiving buffer 234. The communication buffer 232 is used to transmit and receive data smoothly to and from the content distribution server 12 and to and from the playback apparatus 30. The receiving buffer 234 transfers the compressed data to the decoder 240 in a stable manner. The memory 230 may be, for example, a static random access memory (SRAM), a dynamic random access memory (DRAM), a synchronous DRAM (SDRAM), a Rambus DRAM (RDRAM), or the like.

The receiving buffer 234 functions as a first buffer that temporarily stores the compressed data that is received from the content distribution server 12. The compressed data that is temporarily stored in the receiving buffer 234 is transferred to the decoder 240 based on the control of the control portion 250. Also, where the content distribution server 12 transmits the compressed data using the download system, the storage device 220 stores the compressed data, and the receiving buffer 234 reads the compressed data from the storage device 220 and stores it temporarily. Note that the receiving buffer 234 may be provided as a separate memory from the memory 230.

The decoder 240 decodes, in specified decoding units, such as frame units, for example, the compressed data that is transferred from the receiving buffer 234 and generates decompressed digital data (hereinafter called simply "decompressed data"). The decompressed data that is generated is stored temporarily in the communication buffer 232 under the control of the control portion 250, and is then output to the playback apparatus 30.

The control portion 250 is configured from a central processing unit (CPU), a ROM, a RAM, and the like, for example, and controls the overall operations of the home server 20. For example, the control portion 250 controls the streaming transfer process that transmits the decompressed data to the playback apparatus 30 while the compressed data is being received from the content distribution server 12. The details of the streaming transfer process will be described in detail later.

The buffering status monitoring portion 260 monitors the state of the data volume, that is, the buffering status, of the compressed data that is stored temporarily in the receiving buffer 234 and transmits the buffering status to the playback apparatus 30. Specifically, the buffering status is assumed to be the actual data volume of the compressed data that is stored temporarily in the receiving buffer 234, the ratio of a specified standard data volume (for example, a first data volume, described later) that the actual data volume constitutes, or the like. The buffering status may be transmitted at regular intervals, when a request comes from the playback apparatus 30, or each time the data volume of the compressed data that is stored temporarily in the receiving buffer 234 reaches a specified value.

Figure 3:
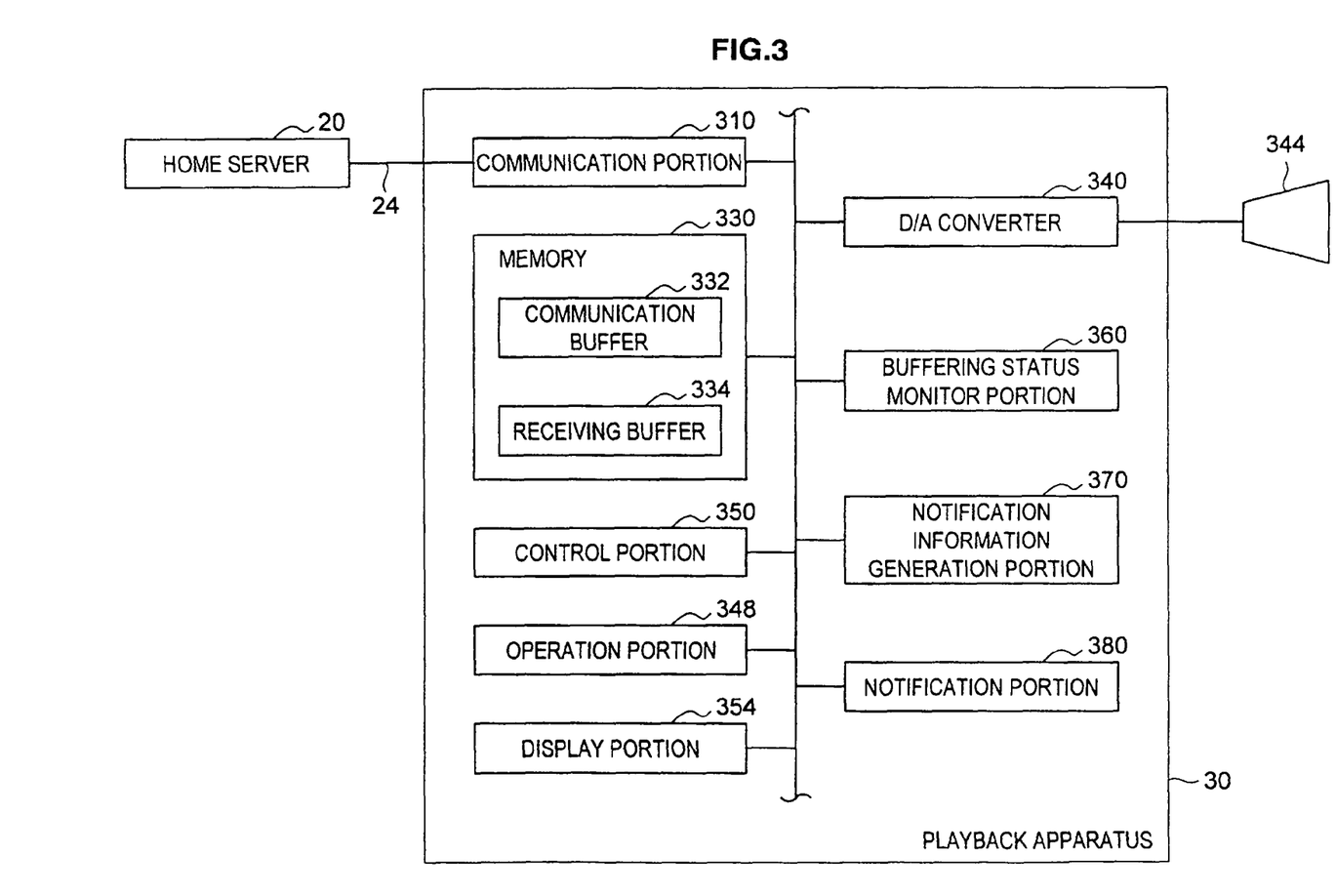
FIG. 3 is a block diagram that shows the configuration of a playback apparatus according to the embodiment.

FIG. 3 is a block diagram that shows the configuration of the playback apparatus 30. The playback apparatus 30 includes a communication portion 310, a memory 330, which includes a communication buffer 332 and a receiving buffer 334, a D/A converter 340, an operation portion 348, a control portion 350, a display portion 354, a buffering status monitoring portion 360, a notification information generation portion 370, and a notification portion 380. Also, the audio output portion 344 is mounted externally on the playback apparatus 30 as an audio output unit. However, the present invention is not limited by this example, and the playback apparatus 30 may also have a built-in audio output unit, such as a speaker, an earphone, or the like.

The communication portion 310 performs transmission and receiving of various types of information to and from the home server 20. For example, the communication 310 receives the content list that shows the content data that the home server 20 can obtain, transmits a request for transmission of the content data from the content list that the user desires, and receives the decompressed data that results from the decoding of the content data. When the communication portion 310 transmits and receives the content list, the decompressed data, and the like, the communication portion 310 can use the communication buffer 332.

The memory 330 includes the communication buffer 332, which is used to transmit and receive data smoothly to and from the home server 20, and the receiving buffer 334, which transfers the decompressed data to the D/A converter in a stable manner. The memory 330 may be, for example, a static random access memory (SRAM), a dynamic random access memory (DRAM), a synchronous DRAM (SDRAM), a Rambus DRAM (RDRAM), or the like.

The receiving buffer 334 functions as a second buffer that temporarily stores the decompressed data that is received from the home server 20 through the communication portion 310. The decompressed data that is temporarily stored in the receiving buffer 334 is read out based on the control of the control portion 350 and transferred to the D/A converter 340. Note that the playback apparatus 30 can also receive and play back the data that is stored in the storage device 220 of the home server 20.

The D/A converter 340 converts from digital format to analog format the decompressed data that is transferred from the receiving buffer 334. That is, the D/A converter 340 functions as a playback portion that performs the D/A conversion and generates a playback signal. For example, the D/A converter 340 can use a current-summing method to convert linear PCM decompressed data into an analog format playback signal. The playback signal that is generated from the data that is converted to the analog format is output to the audio output portion 344, so that the content data is played back by the audio output portion 344. Note that if the content data is music data, the audio output portion 344 corresponds to a speaker, a headphone, or the like, and if the content data is image data, the audio output portion 344 corresponds to an image display portion. Also, the D/A converter 340 is an example of a D/A conversion portion that converts digital format data to analog format and may be configured of hardware and may be configured of software.

The operation portion 348 is configured from an operation device, an input control circuit, and the like. The operation device includes a touch panel, a button, a switch, a lever, a dial, an optical receiver portion that receives an infrared light signal that is generated by a remote controller, or the like. The input control circuit generates an operation signal in accordance with the operation that the user performs on the operation device, and outputs the operation signal to the control portion 350. By operating the operation portion 348, the user of the playback apparatus 30 can do such things as input various types of data to the playback apparatus 30 and direct a processing operation of the playback apparatus 30. Operations that the user may use the operation portion 348 to perform include, for example, the selection of content data from the content list, content playback, pausing, fast forwarding, rewinding, audio volume adjustment, and the like.

The control portion 350 is configured from a CPU, a ROM, a RAM, and the like, for example, and controls the overall operations of the playback apparatus 30. For example, the control portion 350 controls the streaming playback process, which includes the receiving process that receives the decompressed data from the home server 20 and the transfer process that reads the decompressed data from the receiving buffer 334 and transfers it to the D/A converter 340. The details of the streaming playback process will be described in detail later.

The display portion 354 displays the content list that is received from the home server 20 and that shows the content data that can be distributed by the content distribution server 12. The user can request the transmission of the desired content data based on the display of the content list. The display portion 354 may also display information such as a title, a creator, or the like for the content data that is being played back. The display portion 354 may be configured from a display unit such as a liquid crystal display (LCD) unit, an organic electro-luminescence (OEL) display unit, or the like.

Next, the streaming transfer and the streaming playback that are performed in the present embodiment will be explained with reference to FIGS. 4 to 6.

Figure 4:
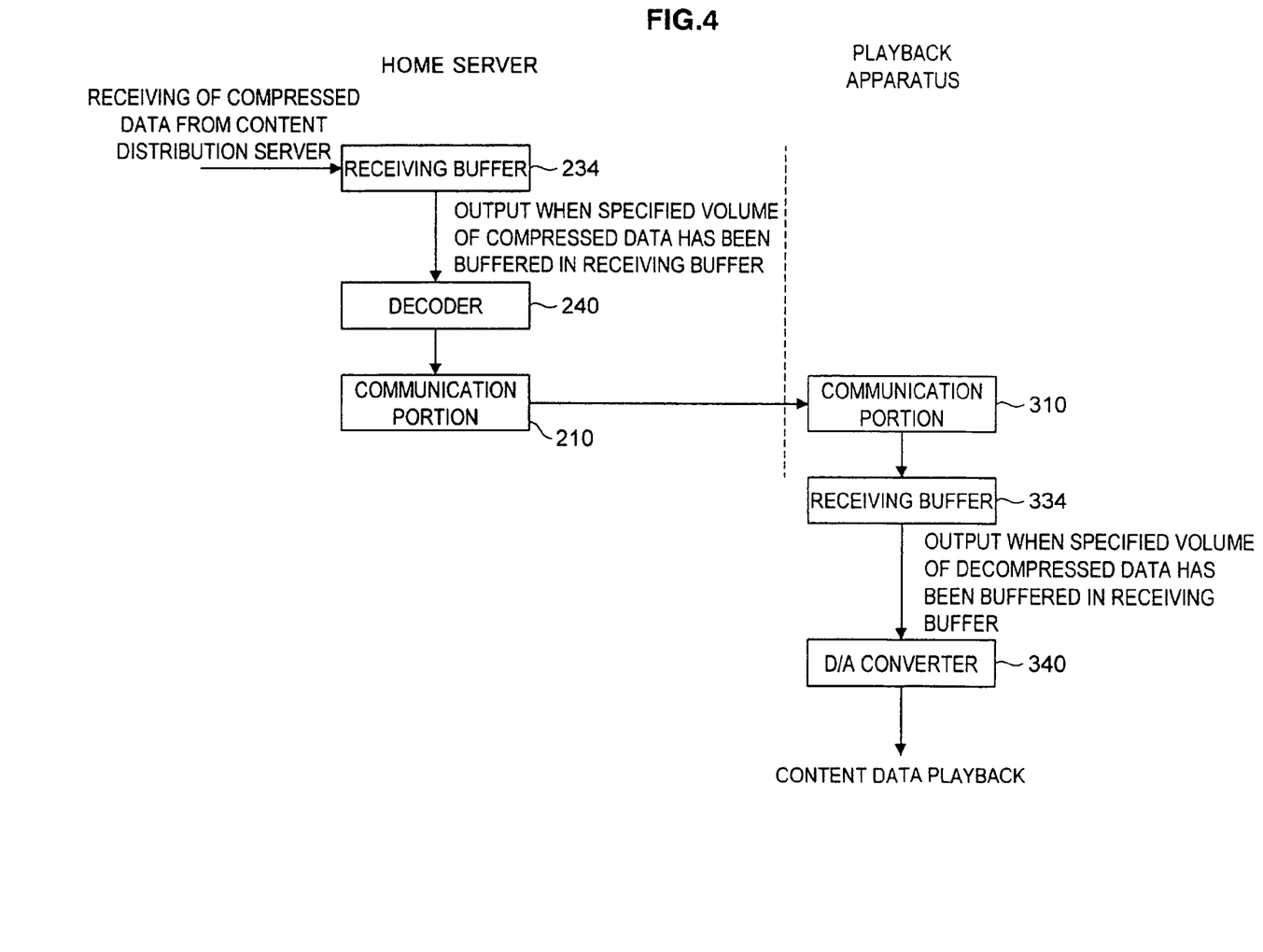
FIG. 4 is an explanatory figure that shows an overview of streaming transfer and streaming playback.

FIG. 4 is an explanatory figure that shows an overview of the streaming transfer and the streaming playback. First, the receiving buffer 234 of home server 20 starts receiving the compressed data from the content distribution server 12. When the receiving buffer 234 has buffered a specified volume of the compressed data (the first data volume), the control portion 250 starts transferring the compressed data to the decoder 240. The decoder 240 decodes the transferred compressed data into the decompressed data, and the control portion 250 controls the process such that the decompressed data is transmitted to the playback apparatus 30 through the communication portion 210. In this specification, the process that includes this series of operations by the home server 20 is called the streaming transfer. Note that the receiving of the compressed data by the receiving buffer 234 and the output of the compressed data to the decoder 240 may be performed continuously or intermittently.

When the playback apparatus 30 has started receiving the decompressed data through the communication portion 310 and the receiving buffer 334 has buffered a specified volume of the decompressed data (a second data volume), the control portion 350 starts transferring the decompressed data to the D/A converter 340. The D/A converter 340 converts the transferred decompressed data from digital format to analog format and generates the playback signal. The audio output portion 344 plays back the content data based on the playback signal. In this specification, the process that includes this series of operations by the playback apparatus 30 is called the streaming playback.

Figure 5:
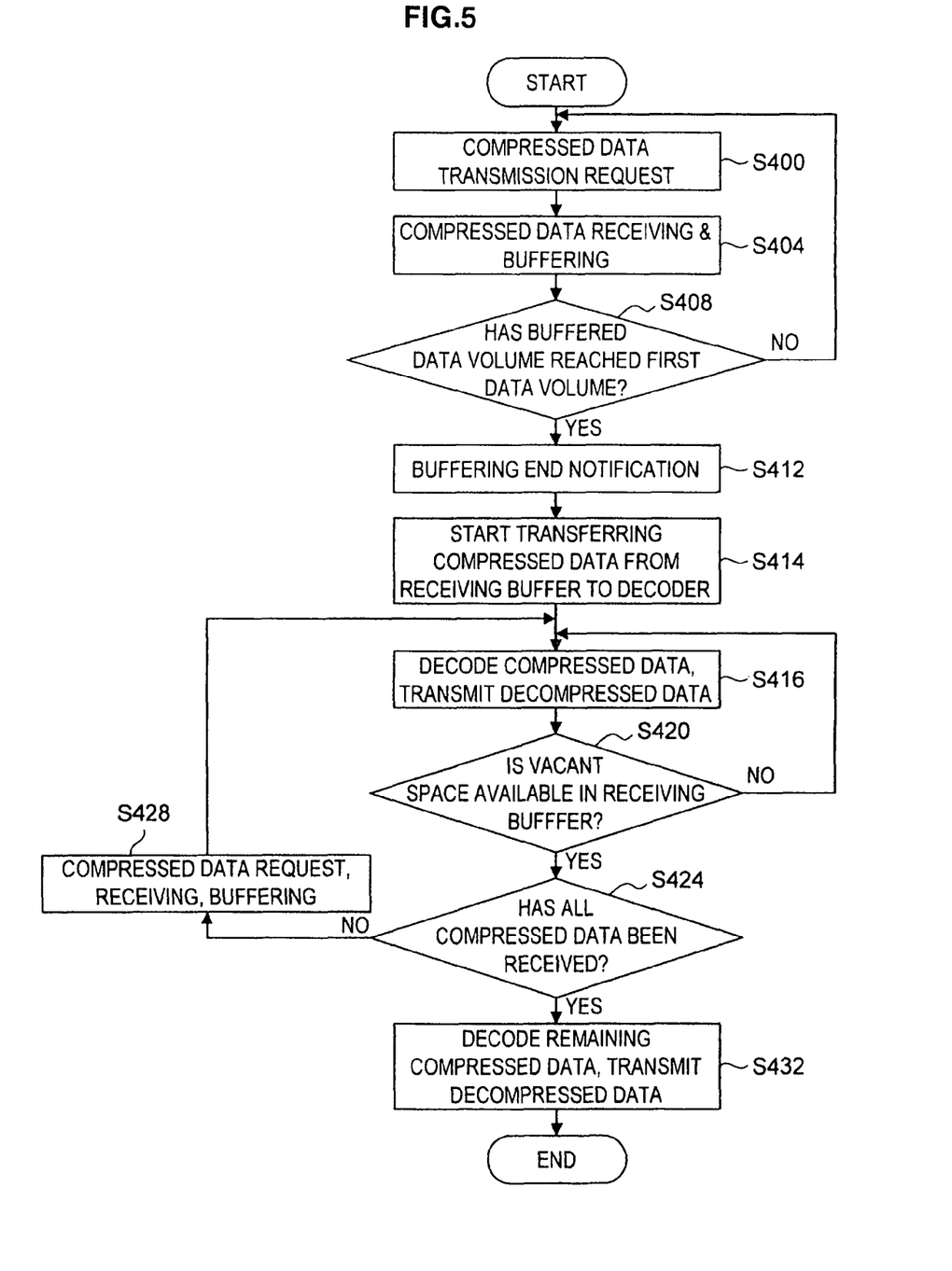
FIG. 5 is a flowchart that shows a detailed operation flow for the streaming transfer that the home server performs according to the embodiment.

FIG. 5 is a flowchart that shows the detailed operation flow for the streaming transfer that the home server 20 performs. First, the home server 20 transmits a request to the content distribution server 12 to transmit the compressed data, in which the content data is compressed (step S400). The home server 20 receives the compressed data that the content distribution server 12 distributes in response to the request from the home server 20 for the compressed data, then stores the compressed data temporarily, that is, buffers the compressed data, in the receiving buffer 234 (step S404).

Next, the control portion 250 of the home server 20 determines whether or not the buffered data volume, that is, the data volume of the compressed data that is stored temporarily in the receiving buffer 234, has reached the first data volume (step S408). Here, the first data volume is a data volume that is sufficient for the decoding of the compressed data to start at a subsequent stage of the process. The decoding process is a process that divides the compressed data into frame units, then expands the compressed data in frame units. Therefore, the first data volume can be set to a data volume of at least one frame of the compressed data.

In a case where it is determined at step S408 that the buffered data volume has not reached the first data volume, the home server 20 once again transmits a request to the content distribution server 12 to distribute the compressed data (step S400). In a case where it is determined at step S408 that the buffered data volume has reached the first data volume, the home server 20, under the control of the control portion 250, transmits to the playback apparatus 30 a buffering end notification that notifies the playback apparatus 30 that the buffering of the compressed data in the receiving buffer 234 has ended (step S412).

Next, if the playback apparatus 30 requests the transmission of the decompressed data in response to the buffering end notification, the control portion 250 of the home server 20 starts to read out the compressed data from the receiving buffer 234 and transfer it to the decoder 240 (step S414). When the compressed data is transferred, the decoder 240 decodes the compressed data into the decompressed data and outputs the decompressed data to the playback apparatus 30 (step S416). The control portion 250 of the home server 20 then determines whether a specified amount of vacant space is available in the receiving buffer 234 (step S420). The expression "vacant space" means storage space in the receiving buffer 234 in which, for example, the compressed data has not been written or in which the compressed data has been written, but is no longer being used, because it has already been read out by the decoder 240. Also, the specified amount of vacant space may be a data volume that is set in advance or a data volume that is equal to a minimum unit of the data that is stored in the receiving buffer 234.

In a case where it is determined at step S420 that vacant space is not available in the receiving buffer 234, the home server 20 performs the processing shown at step S416 again. In a case where it is determined at step S420 that vacant space is available in the receiving buffer 234, the control portion 250 of the home server 20 determines whether or not all of the compressed data that was requested has been received (step S424). In a case where it is determined that not all of the compressed data that was requested has been received, the home server 20 requests the compressed data from the content distribution server 12, then receives and buffers the compressed data (step S428). Thereafter, the processing shown at step S416 is performed once again.

In a case where the control portion 250 of the home server 20 determines at step S424 that all of the compressed data that was requested has been received, the control portion 250 transfers to the decoder 240 any compressed data that has not already been transferred from the receiving buffer 234 to the decoder 240. The decoder 240 decodes the compressed data into the decompressed data and transmits the decompressed data to the playback apparatus 30 (step S432).

Figure 6:
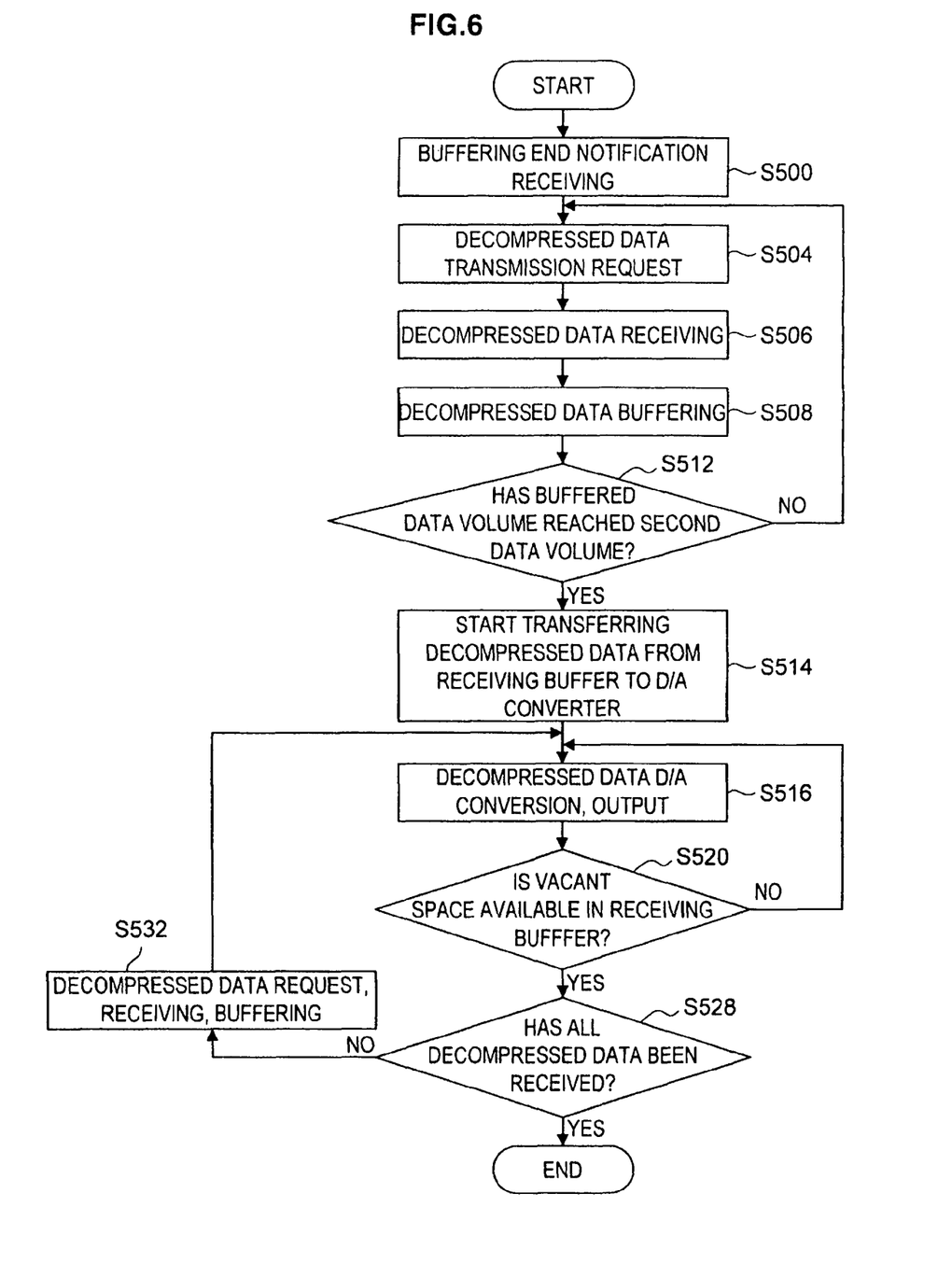
FIG. 6 is a flowchart that shows the detailed flow for the streaming playback that the playback apparatus performs according to the embodiment.

FIG. 6 is a flowchart that shows the detailed flow for the streaming playback that the playback apparatus 30 performs. First, when the buffering end notification is received from the home server 20 (step S500), the control portion 350 of the playback apparatus 30 transmits a request to the home server 20 to transmit the decompressed data (step S504). Then, when the decompressed data is received from the home server 20 through the communication portion 310 (step S506), the control portion 350 buffers the decompressed data in the receiving buffer 334 (step S508).

Next, the control portion 350 of the playback apparatus 30 determines whether or not the data volume of the decompressed data that is temporarily stored in the receiving buffer 334, that is, the buffered data volume, has reached the second data volume (step S512). Here, the second data volume can be set to at least the data volume that is necessary for the D/A converter 340 to generate the playback signal continuously.

In a case where it is determined at step S512 that the buffered data volume in the receiving buffer 334 has not reached the second data volume, the playback apparatus 30 once again performs the processing shown at step S504. In a case where it is determined at step S512 that the buffered data volume in the receiving buffer 334 has reached the second data volume, the control portion 350 of the playback apparatus 30 starts transferring the decompressed data from the receiving buffer 334 to the D/A converter 340 (step S514).

Next, the D/A converter 340 of the playback apparatus 30 performs D/A conversion of the decompressed data that was transferred from the receiving buffer 334 and outputs the playback signal (step S516). The audio output portion 344 of the playback apparatus 30 can play back the content data based on the playback signal.

Next, the control portion 350 of the playback apparatus 30 determines whether vacant space is available in the receiving buffer 334 (step S520). Here, "vacant space" means storage space in the receiving buffer 334 in which, for example, the decompressed data has not been written or in which the decompressed data has been written, but is no longer being used, because it has already been read out by the D/A converter 340. Also, a specified amount of vacant space may be a data volume that is set in advance or a data volume that is equal to a minimum unit of the data that is stored in the receiving buffer 334.

In a case where it is determined at step S520 that vacant space is not available in the receiving buffer 334, the playback apparatus 30 performs the processing shown at step S516 again. In a case where it is determined at step S520 that vacant space is available in the receiving buffer 234, the control portion 350 of the playback apparatus 30 determines whether or not all of the decompressed data that was requested from the home server 20 has been received (step S528). In a case where it is determined that not all of the decompressed data that was requested has been received, the playback apparatus 30 requests that the home server 20 transmit the remaining decompressed data, then receives and buffers the decompressed data (step S532). Thereafter, the playback apparatus 30 once again performs the processing shown at step S516.

In a case where the control portion 350 of the playback apparatus 30 determines that all of the decompressed data that was requested has been received at step S528, the control portion 350 transfers the untransferred decompressed data from the receiving buffer 334 to the D/A converter 340, and the D/A converter 340 performs D/A conversion of the transferred decompressed data.

Returning to the explanation of the configuration of the playback apparatus 30, with reference to FIG. 3, the buffering status monitor portion 360 monitors the state of the data volume of the decompressed data that is stored temporarily in the receiving buffer 334, that is, the buffering status of the receiving buffer 334, and outputs the buffering status to the notification information generation portion 370. Specifically, the buffering status is assumed to be the actual data volume of the decompressed data that is stored temporarily in the receiving buffer 334, the ratio of a specified standard data volume (for example, the second data volume) that the actual data volume constitutes, or the like.

The notification information generation portion 370 receives as inputs the buffering status of the receiving buffer 234 of the home server 20 and the buffering status of the receiving buffer 334 of the playback apparatus 30, then generates notification information to notify the user of the buffering statuses of the receiving buffer 234 and the receiving buffer 334.

The notification portion 380 notifies the user of the notification information that the notification information generation portion 370 has generated. The methods by which the notification portion provides the notification information are many and varied, and the details will be described later, but for example, conceivable notification methods might utilize a display of an image, an output of a sound, a generation of a vibration, and the like. Note that in a case where the notification portion 380 uses an image to provide the notification information, it is not necessary for the notification portion 380 and the display portion 354 to be provided separately.

Next, an example of a notification method by which the notification portion 380 provides the notification information based on the notification information that is generated by the notification information generation portion 370 will be explained with reference to FIGS. 7 to 10.

FIG. 7 is an explanatory figure that shows an example of the notification method by which the notification portion 380 provides the notification information. In the example shown in FIG. 7, the notification information generation portion 370 generates the notification information such that the buffering statuses of the receiving buffer 234 of the home server 20 and the receiving buffer 334 of the playback apparatus 30 are displayed on the notification portion 380 using percentages as numerical value information.

Figure 7A:
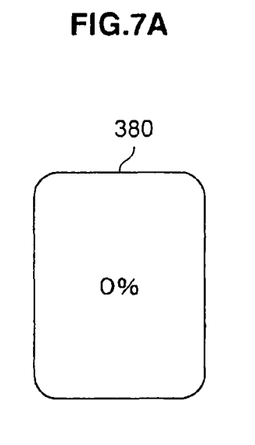
FIG. 7 is an explanatory figure that shows an example of a notification method by which a notification portion provides notification information according to the embodiment.

FIG. 7A shows the notification information that is displayed at the point in time when the receiving buffer 234 of the home server 20 starts buffering the compressed data. At this point in time, the receiving buffer 234 of the home server 20 and the receiving buffer 334 of the playback apparatus 30 have not stored any data at all, so "0%" is displayed as the notification information. Thereafter, as the receiving buffer 234 of the home server 20 buffers the compressed data, the value of the notification information can be increased.

Figure 7B:
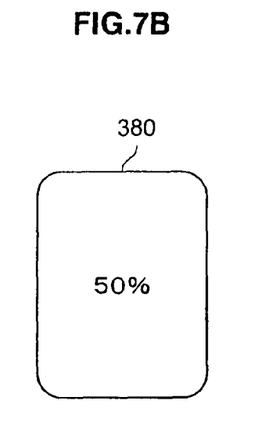

FIG. 7B shows the notification information at the point in time when the receiving buffer 234 of the home server 20 has buffered a volume of the compressed data equal to the first data volume and the playback apparatus 30 has received the buffering end notification from the home server 20. At this point in time, the receiving buffer 234 of the home server 20 has ended the buffering, but the receiving buffer 334 of the playback apparatus 30 has not stored any data, so "50%" is displayed as the notification information.

Note that the percentage, as shown in FIG. 7B, may be the percentage of the first data volume that is represented by the data volume of the compressed data that the receiving buffer 234 has buffered, multiplied by a first weighting factor of 0.5. For example, when the notification portion 380 displays "18%" as the notification information, it would mean that the receiving buffer 234 has temporarily stored a data volume of the compressed data that is equal to 36% of the first data volume.

Figure 7C:
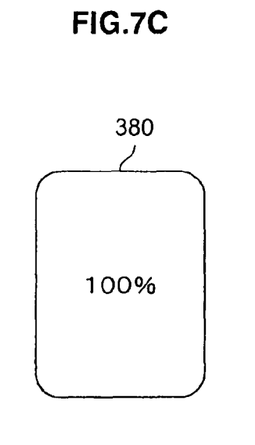

FIG. 7C shows the notification information at the point in time when the receiving buffer 334 of the playback apparatus 30 has buffered a volume of the compressed data equal to the second data volume. At this point in time, the receiving buffer 234 of the home server 20 and the receiving buffer 334 of the playback apparatus 30 have completed the buffering, so "100%" is displayed as the notification information on the notification portion 380.

Note that the percentage after the playback apparatus 30 has received the buffering end notification, as shown in FIG. 7C, may be the sum of 50% and the percentage of the second data volume that is represented by the data volume of the decompressed data that the receiving buffer 334 has buffered, multiplied by a second weighting factor of 0.5. For example, when "74%" is displayed as the notification information, it would mean that the receiving buffer 234 has ended buffering and the receiving buffer 334 has temporarily stored a data volume of the decompressed data that is equal to 48% of the second data volume.

Thus, according to the present embodiment, the notification information that is displayed takes into account not only the buffering status of the receiving buffer 234 of the home server 20, but also the buffering status of the receiving buffer 334 of the playback apparatus 30, so the user can accurately ascertain the time remaining until the playback of the content data starts.

Note that the example shown in FIG. 7 shows the case where "50%" is displayed as the notification information at the point in time when the receiving buffer 234 of the home server 20 has ended buffering, that is, the case where the first weighting factor is 0.5. However, the first weighting factor may be varied as is deemed appropriate.

For example, in a case where more time is needed for the buffering in the receiving buffer 334 than for the buffering in the receiving buffer 234, the value of the first weighting factor can be reduced and the value of the second weighting factor can be increased. Also, the system may be configured such that the value of the first weighting factor automatically changes in accordance with the system by which the content data is distributed, such as a streaming system or a download system, for example.

FIG. 8 is an explanatory figure that shows an example of another notification method by which the notification portion 380 provides the notification information. In the example shown in FIG. 8, the notification information generation portion 370 generates the notification information as image information such that the buffering statuses of the receiving buffer 234 of the home server 20 and the receiving buffer 334 of the playback apparatus 30 are displayed on the notification portion 380 in the form of a flashing or non-flashing letter "R".

Figure 8A:
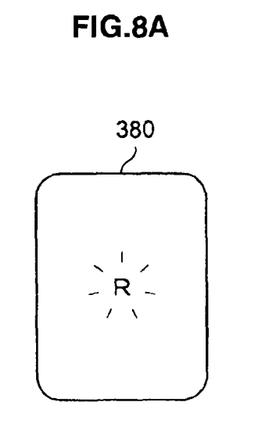
FIG. 8 is an explanatory figure that shows an example of another notification method by which the notification portion provides the notification information according to the embodiment.

FIG. 8A shows the notification information that is displayed by the notification portion 380 from the time when the receiving buffer 234 of the home server 20 starts buffering the compressed data until the receiving buffer 234 ends the buffering. The short lines surrounding the letter "R" indicate a flashing state of the letter "R". Also, the number of the short lines indicates the flashing speed, meaning that the greater the number of the short lines, the faster the flashing speed.

Figure 8B:
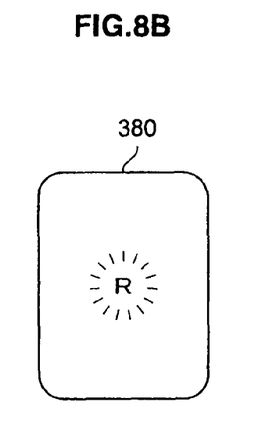

FIG. 8B shows the notification information that is displayed by the notification portion 380 from the time when the receiving buffer 234 of the home server 20 has ended the buffering and the receiving buffer 334 of the playback apparatus 30 has started the buffering of the decompressed data until the time when the receiving buffer 334 has completed the buffering. As shown in FIG. 8B, when the receiving buffer 334 of the playback apparatus 30 starts the buffering of the decompressed data, the notification portion 380 can display the notification information in which the flashing speed of the letter "R" is fast. Note that the changing of the flashing speed may be performed using the receiving of the buffering end notification by the playback apparatus 30 as a trigger.

Figure 8C:
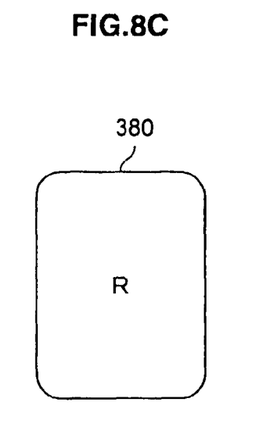

FIG. 8C shows the notification information that is displayed by the notification portion 380 after the receiving buffer 334 of the playback apparatus 30 has completed the buffering of the decompressed data. A state in which the short lines are not surrounding the letter "R", as in FIG. 8C, indicates a state in which the letter "R" is not flashing.

Thus, according to this example of the providing of the notification information, the user can ascertain the buffering status of the receiving buffer 234 of the home server 20 and the buffering status of the receiving buffer 334 of the playback apparatus 30, based on the presence or absence of the flashing, and the flashing speed, of the letter "R".

Note that the letter that is displayed by the notification portion 380 is not limited to the letter "R" and may be any alphabetic character and any symbol. Also, the changing of the flashing speed is not limited to the time when the playback apparatus 30 has received the buffering end notification from the home server 20, but may also be configured such that the flashing speed is changed in incremental steps according to the current buffering statuses of the receiving buffer 234 of the home server 20 and the receiving buffer 334 of the playback apparatus 30.

FIG. 9 is an explanatory figure that shows an example of another notification method by which the notification portion 380 provides the notification information. In the example shown in FIG. 9, the notification information generation portion 370 generates the notification information such that the buffering statuses of the receiving buffer 234 of the home server 20 and the receiving buffer 334 of the playback apparatus 30 are displayed on the notification portion 380 in the form of a strip-shaped meter.

For the notification portion 380 to provide the buffering statuses of the receiving buffer 234 and the receiving buffer 334 in the form of the strip-shaped meter, as in FIG. 9, the notification information generation portion 370 first calculates the buffering statuses of the receiving buffer 234 and the receiving buffer 334 as percentages, as was explained above for FIG. 7. Then the area of the strip-shaped meter can be determined according to the magnitudes of the calculated percentages.

Figure 9A:
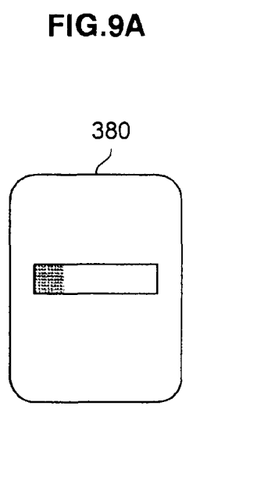
FIG. 9 is an explanatory figure that shows an example of another notification method by which the notification portion provides the notification information according to the embodiment.
Figure 9B:
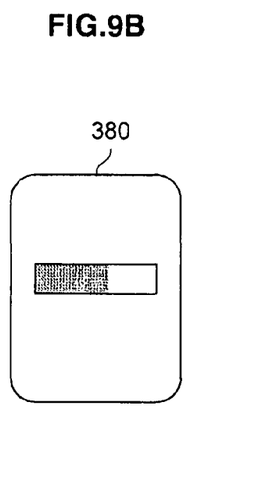
Figure 9C:
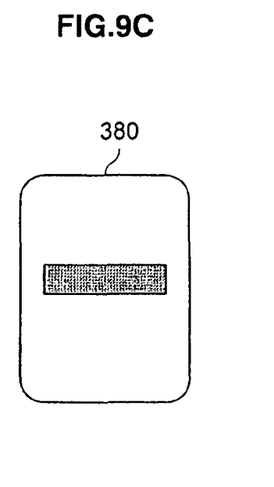

In the example shown in FIG. 9, the larger the area of the strip-shaped meter that is shown, the more advanced is the buffering in the receiving buffer 234 and the receiving buffer 334. That is, as the buffering progresses, the area of the strip-shaped meter increases continuously in the order shown in FIGS. 9A, 9B, and 9C. Therefore, according to this notification method for the notification information, the user can ascertain the buffering statuses of the receiving buffer 234 and the receiving buffer 334 intuitively by looking at the strip-shaped meter.

Figure 10:
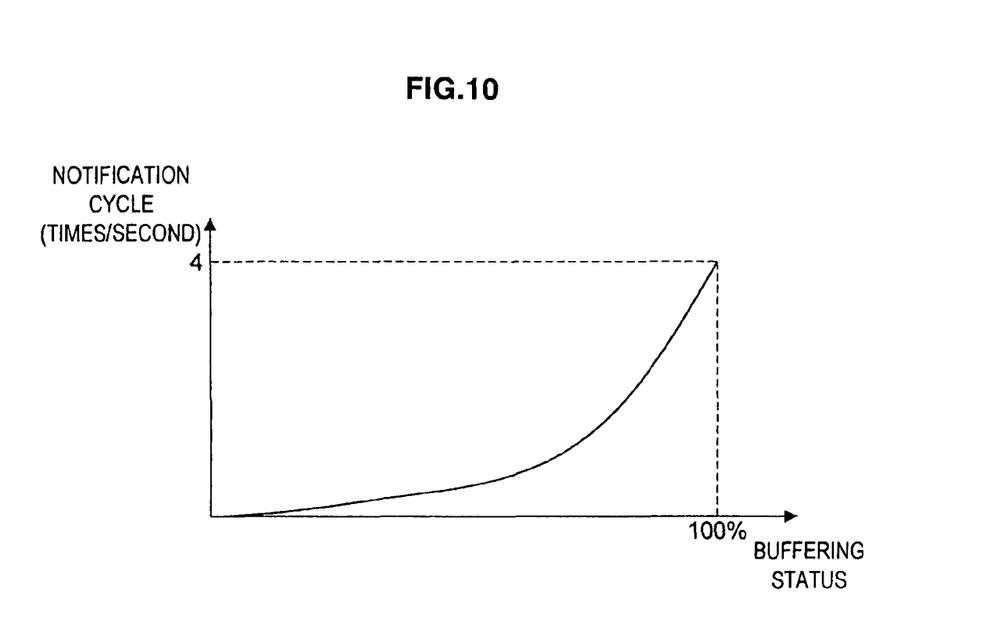
FIG. 10 is an explanatory figure that shows an example of another notification method by which the notification portion provides the notification information according to the embodiment.

FIG. 10 is an explanatory figure that shows an example of another notification method by which the notification portion 380 provides the notification information. In the example shown in FIG. 10, the notification information generation portion 370 generates the notification information as sound information such that the buffering statuses of the receiving buffer 234 of the home server 20 and the receiving buffer 334 of the playback apparatus 30 are output from the notification portion 380 in the form of a sound.

To explain this in greater detail, the notification information generation portion 370 increases the number of times the sound is output per unit time as the buffering processes of the receiving buffer 234 and the receiving buffer 334 progress. In the example shown in FIG. 10, the notification information generation portion 370 calculates the buffering statuses of the receiving buffer 234 and the receiving buffer 334 as percentages, then generates the notification information such that the number of times the sound is output from the notification portion 380 per unit time increases along a parabolic line according to the values of the percentages.

For example, the system may be set such that, at the moment when the buffering is completed in the receiving buffer 234 and the receiving buffer 334, the notification portion 380 outputs the sound four times per second. It is also possible to end the generation of the notification information, that is, cut off the output of the sound from the notification portion 380, after the buffering is completed. Note that the sound may be an electronic sound such as a beep or a sound produced by a human being.

According to this notification method for the notification information, the notification information is provided by a sound, so there is no need to provide a display screen to provide the notification information as an image, and the cost of the system can be reduced. Also, the user can accurately ascertain the buffering statuses of the receiving buffer 234 and the receiving buffer 334 while doing other work, just by listening to the sound. Also, because the sound notification cycle increases along a parabolic line, the user can get an approximate idea of the buffering statuses of the receiving buffer 234 and the receiving buffer 334, not only from the speed of the notification cycle, but also from the degree of change in the notification cycle.

Figure 11:
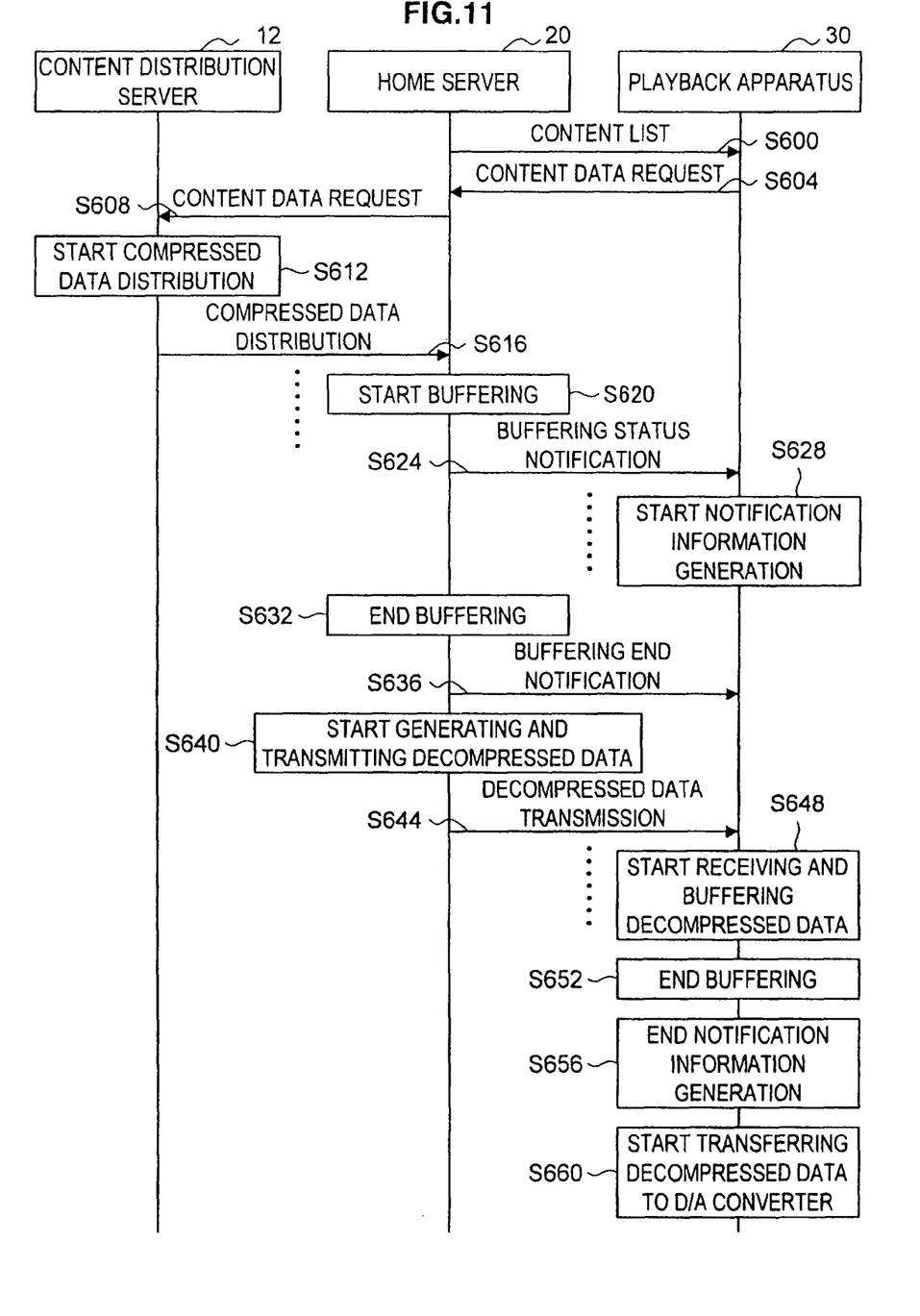
FIG. 11 is timing chart that shows an operation flow for the content transfer system according to the embodiment according to the embodiment.

Next, the operation flow for the content transfer system 10 according to the present embodiment will be explained.

FIG. 11 is timing chart that shows the operation flow for the content transfer system 10 according to the present embodiment. First, the home server 20 transmits to the playback apparatus 30 the content list that shows the content data that can currently be obtained from the content distribution server 12 (step S600). Next, the playback apparatus 30 transmits a request to the home server 20 for the content data that the user has selected from the content list (step S604).

Next, the home server 20 transmits to the content distribution server 12 a request for the content data that was requested by the playback apparatus 30 (step S608). Then the content distribution server 12 starts to distribute to the home server 20 the content data that was requested by the home server 20, the content data having been compressed into the compressed data (step S612). The distribution of the compressed data is performed until all of the compressed data for the content data that the playback apparatus 30 requested is distributed (step S616).

Next, the receiving buffer 234 of the home server 20 starts to store temporarily, that is, starts to buffer, the compressed data that is received from the content distribution server 12 (step S620). Next, the home server 20 starts to notify the playback apparatus 30 of the buffering status of the receiving buffer 234 (step S624). Then, when the playback apparatus 30 is notified by the home server 20 of the buffering status of the receiving buffer 234, the playback apparatus 30 starts to generate the notification information based on the buffering status (step S628).

Next, when the receiving buffer 234 ends the buffering (step S632), the home server 20 notifies the playback apparatus 30 of the end of the buffering (step S636). Next, the home server 20 starts the decoding of the compressed data, which is buffered in the receiving buffer 234, into the decompressed data and starts the transmission of the decompressed data to the playback apparatus 30 (steps S640, S644). The generation and transmission of the decompressed data may be started in response to a request from the playback apparatus 30.

Next, the receiving buffer 334 of the playback apparatus 30 starts the receiving and the buffering of the decompressed data that is transmitted by the home server 20 (step S648). Then the playback apparatus 30 generates the notification information in consideration of the buffering status of the receiving buffer 334. Next, when the receiving buffer 334 ends the buffering (step S652), the playback apparatus 30 ends the generation of the notification information (step S656). Then the control portion 350 of the playback apparatus 30 starts to read out the decompressed data from the receiving buffer 334 and to transfer the decompressed data to the D/A converter 340 (step S660).

As explained above, the playback apparatus 30 according to the present embodiment can generate the notification information in consideration of not only the buffering status of the receiving buffer 234 of the home server 20, but also the buffering status of the receiving buffer 334 of the playback apparatus 30.

Therefore, the problem that occurs in a case where the notification information is generated in consideration of only the buffering status of the receiving buffer 234 of the home server 20, whereby an interval of time passes after the user is notified that the buffering in the receiving buffer 234 is complete until the playback of the content data starts, can be solved.

Also, if the notification information displays the buffering statuses of the receiving buffer 234 of the home server 20 and the receiving buffer 334 of the playback apparatus 30 as percentages, it becomes possible for the user to ascertain the buffering statuses of the receiving buffer 234 and the receiving buffer 334 in greater detail.

A computer program including instructions that command a computer to function as the playback apparatus as described above and a storage medium that stores the program are also provided.

It should be understood by those skilled in the art that various modifications, combinations, sub-combinations and alterations may occur depending on design requirements and other factors insofar as they are within the scope of the appended claims or the equivalents thereof.

For example, in the embodiment described above, examples are given in which the notification information generation portion 370 generates the notification information in the form of an image that uses a letter or a symbol and in the form of a sound. However, the present invention is not limited by these examples. For example, the notification information generation portion 370 may be made such that it changes a color of a light that is emitted by the display portion or the notification portion 380 of the playback apparatus 30 according to the buffering statuses of the receiving buffer 234 and the receiving buffer 334.

Also, the notification portion 380 may be provided outside of the playback apparatus 30. According to such a configuration, the user can easily ascertain the buffering statuses of the receiving buffer 234 and the receiving buffer 334 even if the user is positioned remotely from the playback apparatus 30. Also, the notification information generation portion 370 may be made such that it causes the notification portion 380 to vibrate according to the buffering statuses of the receiving buffer 234 and the receiving buffer 334.

Also, an example was provided in which the home server 20 receives the compressed data from the content distribution server 12, but the home server 20 can also receive the decompressed data from the content distribution server 12. In that case, the home server 20 may be configured such that it transfers the decompressed data to the playback apparatus 30 without executing a separate decoding process.

Also, in the explanation above, an example was provided in which the notification portion 380 displays the buffering statuses of the receiving buffer 234 and the receiving buffer 334 in a consolidated form, but the notification portion 380 may also be made such that the buffering statuses are displayed separately. For example, the numerical value information as shown in FIG. 7 may be provided on two levels, such that the numerical value information on an upper level shows the buffering status of the receiving buffer 234 and the numerical value information on a lower level shows the buffering status of the receiving buffer 334.

Also, the timing at which the notification information generation portion 370 starts the generation of the notification information may be when the playback apparatus 30 requests the content data on the home server 20. Also, the notification information generation portion 370 may be configured such that it does not generate the notification information during the entire interval from step S628 to step S656 in FIG. 11, and it may be configured such that it does not generate the notification information during a portion of the interval from step S628 to step S656, that is, such that it does generate the notification information during one period.

What is claimed is:

1. A playback apparatus to communicate with a second server, the second server temporarily storing in a first buffer compressed digital data that is received from a first server and, when the first buffer has stored a first data volume of the compressed digital data, which is a volume that is sufficient for a decoding of the compressed digital data, reading the compressed digital data out of the first buffer and decoding it into decompressed digital data, the playback apparatus comprising:

a communication portion that transmits data to and receives data from the second server;

a second buffer that temporarily stores the decompressed digital data that is received from the second server through the communication portion;

a digital to analog (D/A) conversion portion that performs a D/A conversion of the decompressed digital data, which is read out from the second buffer, and outputs analog data;

a control portion that performs control such that, when a second data volume of the decompressed digital data, which is a volume that is sufficient for the D/A conversion portion to operate without an interruption of its output, has been temporarily stored in the second buffer, the decompressed digital data that is temporarily stored in the second buffer is transferred to the D/A conversion portion; and a notification information generation portion that generates notification information that conveys storage statuses of the first buffer and the second buffer, when the control portion receives from the second server through the communication portion an end notification that indicates that the first data volume of the compressed digital data has been stored in the first buffer, the control portion transmits through the communication portion request information that requests the decompressed digital data, and when the decompressed digital data that is transmitted from the second server in response to the request information is received through the communication portion, the decompressed digital data is temporarily stored in the second buffer.

2. A playback apparatus to communicate with a second server, the second server temporarily storing in a first buffer compressed digital data that is received from a first server and when the first buffer has stored a first data volume of the compressed digital data, which is a volume that is sufficient for a decoding of the compressed digital data, reading the compressed digital data out of the first buffer and decoding it into decompressed digital data, the playback apparatus comprising:

a communication portion that transmits data to and receives data from the second server;

a second buffer that temporarily stores the decompressed digital data that is received from the second server through the communication portion;

a digital to analog (D/A) conversion portion that performs a D/A conversion of the decompressed digital data, which is read out from the second buffer, and outputs analog data;

a control portion that performs control such that, when a second data volume of the decompressed digital data, which is a volume that is sufficient for the D/A conversion portion to operate without an interruption of its output, has been temporarily stored in the second buffer, the decompressed digital data that is temporarily stored in the second buffer is transferred to the D/A conversion portion; and a notification information generation portion that generates notification information that conveys storage statuses of the first buffer and the second buffer, wherein the notification information is numerical value information that indicates the data volumes that are temporarily stored in the first buffer and the second buffer as ratios of the first data volume and the second data volume, respectively, wherein the numerical value information is a first ratio that indicates the data volume of the compressed digital data that is stored in the first buffer and a second ratio that indicates the data volume of the decompressed digital data that is stored in the second buffer, and a weighting of the numerical value information is varied according to a file format of the compressed digital data, wherein the notification information generation portion generates the notification information based on the data volume of the compressed digital data that is temporarily stored in the first buffer and the data volume of the decompressed digital data that is temporarily stored in the second buffer.

3. The playback apparatus according to claim 2, wherein the notification information is sound information that uses a sound to convey the storage statuses of the first buffer and the second buffer.

4. The playback apparatus according to claim 2, wherein the notification information is image information that uses an image to convey the storage statuses of the first buffer and the second buffer.

5. The playback apparatus according to claim 1, wherein, when the end notification that indicates that the first data volume of the compressed digital data has been stored in the first buffer is received from the second server, the notification information generation portion changes content of the notification information that it generates.

* * * * *